United States Patent [19]

Schmidt

[11] Patent Number: 4,486,710

[45] Date of Patent: Dec. 4, 1984

[54] RADIO FREQUENCY COUPLED DIFFERENTIAL SENSOR COIL FOR IMPROVED MUZZLE VELOCITY MEASUREMENTS

[75] Inventor: Jimmy Q. Schmidt, Baltimore, Md.

[73] Assignee: The United States of America as represented by the Secretary of the Army, Washington, D.C.

[21] Appl. No.: 415,956

[22] Filed: Sep. 8, 1982

[51] Int. Cl.³ ............................................. G01P 3/66
[52] U.S. Cl. ................................................. 324/179
[58] Field of Search ............... 324/179, 178; 73/167; 346/38; 368/108

[56] References Cited

U.S. PATENT DOCUMENTS 4,228,397 10/1980 Schmidt ............................. 324/179
4,342,961 8/1982 Zimmermann et al. ............ 324/179

Primary Examiner—Stanley T. Krawczewicz
Attorney, Agent, or Firm—Anthony T. Lane; Robert P. Gibson; Harold H. Card, Jr.

[57] ABSTRACT

A radio frequency coupled differential sensor coil is configured to measure muzzle velocity of a projectile with improved accuracy. An inner loop of the sensor is positioned to be responsive only to the passage of the projectile and the inner and outer loops are equally responsive to exitation from extraneous sources. A differential amplifier circuit is utilized to cancel the extraneous source signals and amplifying the pulse signal generated by the passage of the projectile through a confined radiation plane.

6 Claims, 8 Drawing Figures

RADIO FREQUENCY COUPLED DIFFERENTIAL SENSOR COIL FOR IMPROVED MUZZLE VELOCITY MEASUREMENTS

GOVERNMENTAL INTEREST

The invention described herein may be manufactured, used and licensed by or for the Government for governmental purposes without the payment to me of any royalty thereon.

BACKGROUND OF THE INVENTION

The present invention is related to an apparatus for accurately measuring the muzzle velocity of a projectile. The present apparatus allows for improved electronic measurement of projectile muzzle velocity by effectively suppressing extraneous signals generated by gun-projectile related parameters.

Various means have been used in the prior art to measure projectile velocity. Most of these past devices measure the time interval taken for a projectile to traverse a known distance. From this information, velocity of the projectile is computed. The problem with some of these devices is that the velocity computed is the average velocity at the midpoint of the measuring device and not the actual muzzle velocity. These prior art devices have utilized velocity coils, light screens, breakwires, strain patches and pressure gages as a sensing element.

Other prior art devices use high speed photography with light or x-rays to measure the distance that the projectile travels in a known time interval. The problem with this type of measurement is that the obtained velocity is the velocity measured at the instrument and not the velocity of the projectile at the muzzle.

Micro-wave interferometry has also been used to measure projectile velocity in-bore as well as downrange from the launch weapon. The problem with microwave interferometry is that there is a severe loss of signal level at the muzzle due to ionized gases thus causing the measurement to be temporarily lost at the time of muzzle exit.

PRIOR ART DISCLOSURE STATEMENT

U.S. Pat. No. 4,228,397 discloses an electronic velocimeter using a radio frequency coupled inductive sensor coil to provide a real time measurement of projectile velocity directly at the muzzle. This device operates on the principle that the radio frequency level developed across the sensor is modulated by the passage of the projectile through the single sensor. The former device can be distinguished from the present invention by the different structural elements of the latter. These elements function to make the sensor non-responsive to the changes in the transient environment at the muzzle. The prior art device is responsive to transient environmental changes, such as, pressure loading induced electric current caused by ionized gas, change in dielectric constant, and relative motion of the sensor and the mounting to the extent that signals developed from these extraneous sources are of sufficient amplitude to substantially decrease the accuracy and reliability of the muzzle velocity measurement.

SUMMARY OF THE INVENTION

A radio frequency coupled differential sensor provides measurement of projectile muzzle velocity with substantially improved accuracy. The present differential sensor coil is designed to effectively suppress extraneous signals while at the same time detecting the passage of the projectile over a specific interval of time. The differential sensor coil utilizes two concentric single loop inductors in a configuration such that only the inner loop is responsive to the passage of the projectile, while the inner and outer loops are equally responsive to excitation from extraneous sources. An electrically coupled differential amplifier is used to cancel out the signals from the extraneous sources while amplifying the signal from the projectile.

An object of the present invention is to provide a radio frequency coupled differential sensor coil for improved muzzle velocity measurements.

Another object of the present invention is to provide a R.F. coupled differential sensor which is responsive only to the passage of the projectile and not to modulation caused by extraneous signals.

A further object of the present invention is to provide a R.F. coupled differential sensor having improved stability caused by the cancellation of static D.C. offset, improved frequency and amplitude stability due to a decrease in sensitivity to temperature variations, and less susceptible to variations in mounting the sensor to the gun.

For a better understanding of the present invention, together with other and further objects thereof, reference is made to the following descriptions taken in connection with the accompanying drawings.

BRIEF DESCRIPTION OF THE DRAWINGS

Throughout the following description like reference numerals are used to denote like parts of the drawings.

DESCRIPTION OF THE PREFERRED EMBODIMENTS

Figure 1:
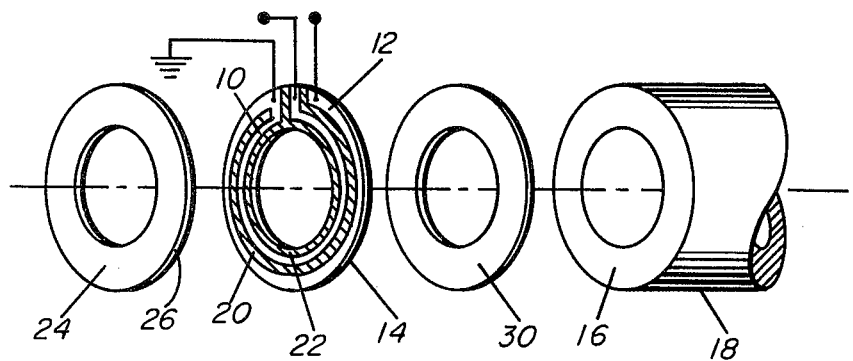
FIG. 1 is an expanded view of the sensor coil assembly.
Figure 2:
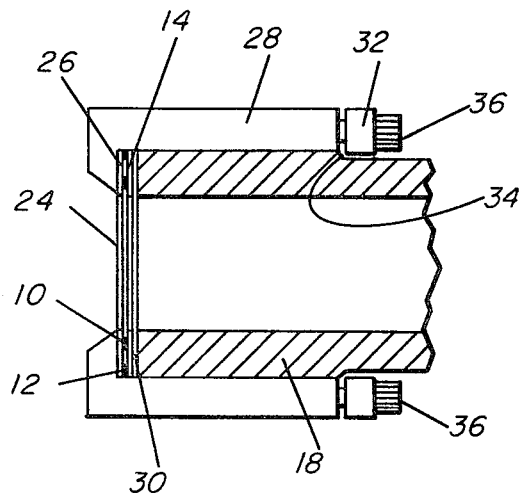
FIG. 2 is a partial cross sectional view of the sensor coil in a typical mounting arrangement.

Referring now to FIGS. 1 and 2, the metallic sensor coil inner loop 10 and outer loop 12 are formed by methods well known in the art on an annular piece of printed circuit board 14 and fixedly mounted to the front face 16 of the muzzle of a gun tube 18. The sensing coil elements 10 and 12, which lie in the same plane, are separated from the gun tube 18 by the thickness of the printed board insulator substrate 14. Coils 10 and 12 are separated from each other by the substrate open-circular insulated area 20 and the closed circular insulated pattern area 22. A second metallic ring 24 disposed on printed circuit board 26 forms an electro-magnetic shield in front of the sensing loop 10 and 12. The shield 24 is separated from the sensor elements 10 and 12 by the thickness of the insulating substrate 26. The Shield 24 and the sensors 10 and 12 assemblies are securely clamped to the face 16 of the gun tube 18 by a mounting collar 28. A thin high temperature annularly shaped seal 30 is disposed intermediate substrate 14 and front face 16 to prevent high pressure gases from penetrating into the sensor assembly and blowing the assembly, shown in FIG. 2, off the gun tube 18 during firing.

The mounting collar 28 is fixedly clamped to the gun tube 18 by hemispherical split collars 22 which engage a raised shoulder 34 on the end of the gun tube 18 and are held in abutment therewith by screws 36.

Figure 3:
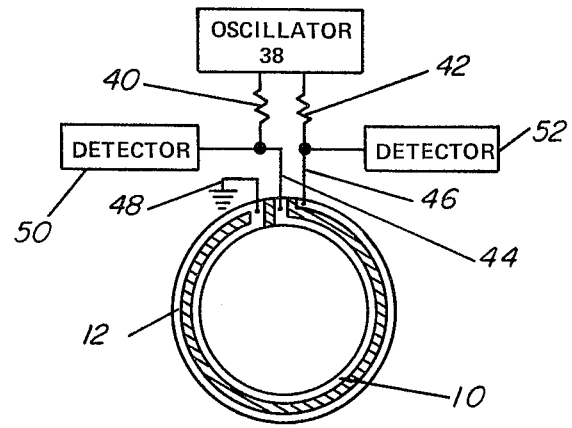
FIG. 3 is a schematic of the sensor coil electrically coupled to a portion of the electronic velocimeter circuit.

Referring now to FIG. 3, the sensing loops 10 and 12 are electrically loosely coupled to a radio frequency (RF) Colpitts type oscillator 38 through isolation resistors 40 and 42 via electrical conductors 44 and 46 which are electrically connected to inner and outer sensing loops 10 and 12 respectively. The other ends of the loops 10 and 12 are connected to a common ground by conductor 48. The inductance of the sensing coils 10 and 12 is selected to resonate at approximately the same frequency as the oscillator 38. The operating frequency of the oscillator is approximately 15 megahertz. Detectors 50 and 52 have their inputs electrically connected to the sensing coils 10 and 12 respectively and to the output terminals of the oscillator 32.

In operation, a radio frequency level is developed across the two sensor coils 10 and 12 by the oscillator 38. The electro-magnetic radiated field generated by sensor coils 10 and 12 is partially confined by the gun tube 18 to the rear of the sensor coils 10 and 12 and by the shield 24 and the mounting collar 28 in front of the sensor coils 10 and 12. By confining the radiated field in this manner, detection of the projectile, as it approaches and leaves the plane of the sensor coils, is reduced to a small confined region. This limited region of radiation results in better definition of a projectile signature.

Figure 4:
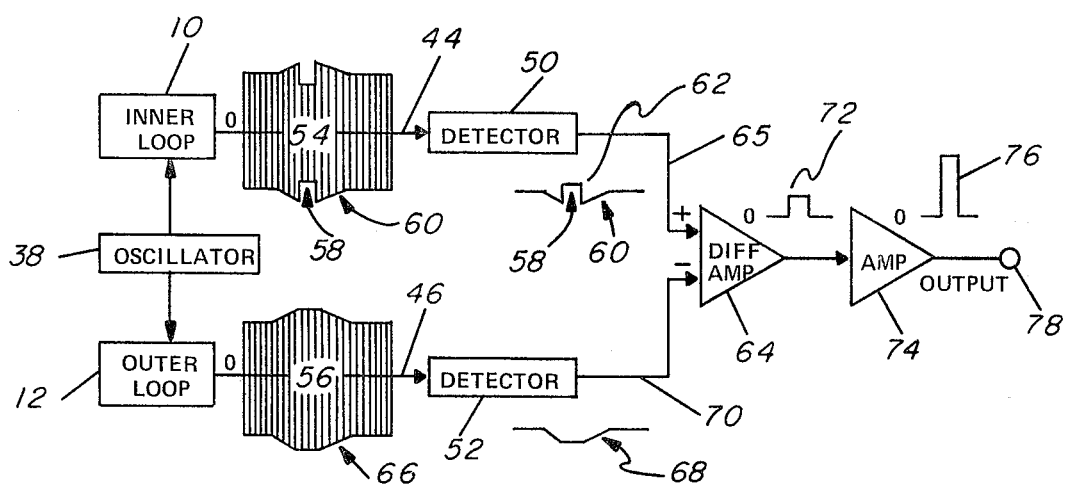
FIG. 4 is a block diagram of the complete differential sensor circuit with representative wave forms.

Referring now to FIG. 4, the block diagram includes representative signal wave forms 54 and 56 at the output terminals of the differential sensor circuit resulting from the passage of a simple cylindrically shaped projectile and base line modulation from extraneous sources. The radio frequency level developed across the inner coil loop 10 and 58 is modulated by the passage of the projectile and at 60 by extraneous sources and amplitude detected via conductor 44 by detector 50. The detector and filtered signal 62 is electrically coupled to the non-inverting input of a low gain wide band differential amplifier 64 via electrical conductor 65. The extraneous sources also modulate the radio frequency level of wave form 56 developed across the outer sensor loop 12 at 66. However, the outer loop 12 is too far from the projectile to be affected by the projectile. The modulated radio frequency wave for 56 signal is fed via conductor 46 to the input of the detector 52. The filtered signal 68 is fed to the inverting input of the differential amplifier 64 via electrical conductor 70. The differential amplifier cancels the components of the two input signals 62 and 68 which are equal and generates an output pulse 72 of the component of the input signal not common to input signals 62 and 68. The amplifier 74 generates an amplified signal 76 at the output 78. The amplitude of output signal 72 is proportional to the distance between the inner sensor loop 12 and the projectile outer diameter as the projectile passes sensor loop 10. The time interval of the pulse is equal to the time it takes the projectile, or of predetermined points on the projectile to pass the sensor. Output pulse 76 is then fed to a voltage comparator and an appropriate logic circuit, now shown, to provide a measurement of the time interval for the computation of projectile velocity.

To understand how the differential sensor improves the accuracy and reliability of projectile velocity measurement, a complete understanding of the generation of the time interval pulse is necessary.

Figure 5:
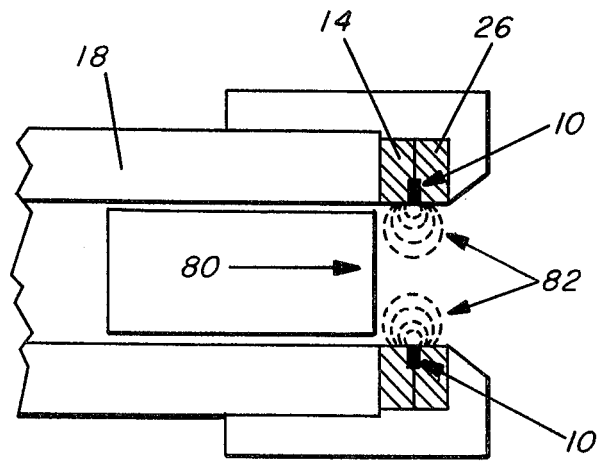
FIG. 5 is a simplified cross sectional view of the sensor assembly and projectile in the gun muzzle area.
Figure 6:
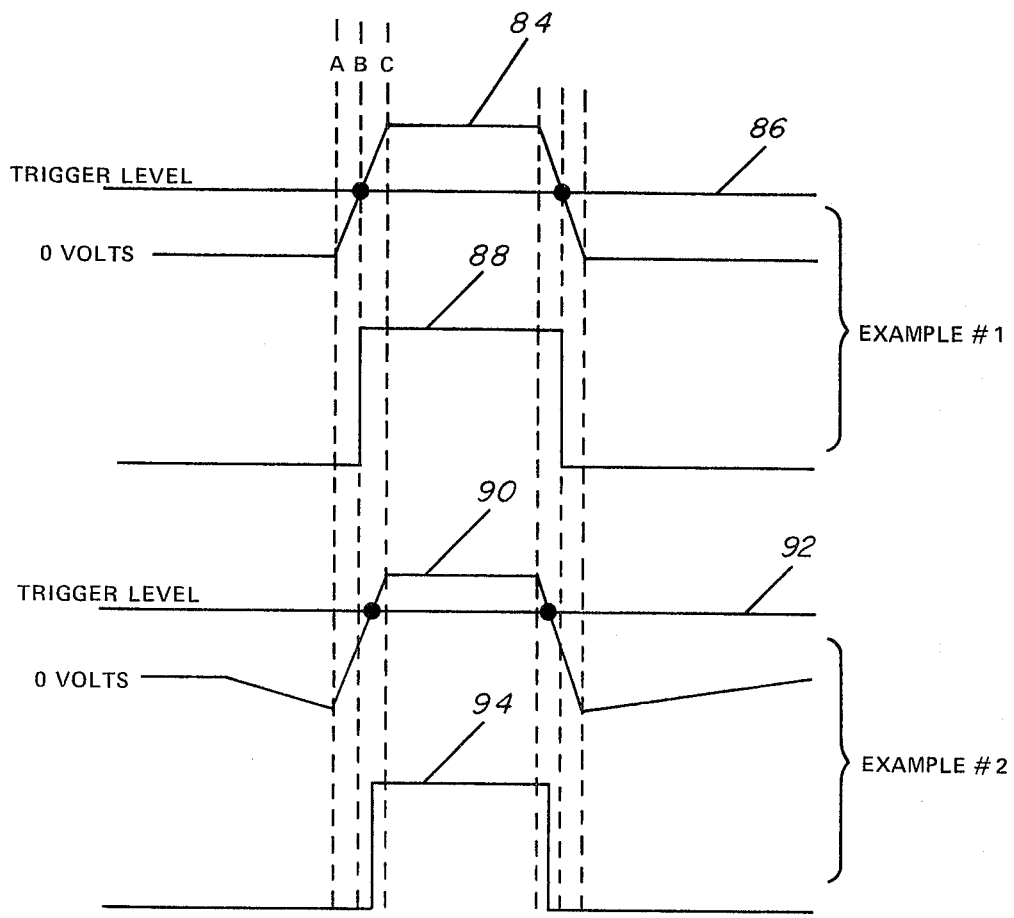
FIG. 6 is a time interval pulse diagram of the projectile as it passes through the sensor assembly of FIG. 5.

FIG. 5 shows a simplified cross sectional view of the sensor assembly with only the inner sensors loop 10 shown for purposes of clarity. FIG. 6 shows two examples of a detected signal, and a time interval pulse of a simple cylindrical projectile 80 passing through the sensor of FIG. 5 on the same time equivalent to the original single sensor design of U.S. Pat. No. 4,228,397.

Referring to FIG. 5 and Example #1 the sensor loop 10 is sandwiched between substrate materials 14 and 26 and radiates an electromagnetic field 82 from the inner diameter of the loop 10 into the gun bore of gun tube 18. As the leading edge of the projectile 80 reaches the end of the gun tube, at point A, the interaction of the projectile 80 and the radiated field 82 begins to modulate the radio frequency level of the oscillator 38, producing the detected pulse 84. The leading edge of pulse 84 increases until the leading edge of projectile 80 is at point C, and remains at that level until the trailing edge of the projectile 80 is a point A. At that time, the interaction of the projectile 80 and radiated field 82 begins to decrease and the pulse amplitude of pulse 84 decreases. When the trailing edge of the projectile 80 is at point C, the signal level has returned to the zero baseline level. A voltage comparator circuit, now shown, is set to trigger at a voltage level 86, corresponding to point B, and a well defined time interval pulse 88 will be generated. The leading and trailing edges of the time interval pulse 88 correspond precisely to the time at which the leading and trailing edges of the projectile 80 were aligned with the sensor loop 10. Since the time duration of this pulse 88 corresponds to the passage of the projectile 80 baseline length, the velocity of the projectile can be computed.

Proper determination of the triggering point is very important for good system accuracy. If the trigger level is set at a voltage level anywhere from the zero volt baseline to the peak amplitude of the pulse, the maximum error from the voltage comparator, E $\max_c$ will be = tr/TI or $\pm \Delta ls/\Delta lp$ where:
  tr = the rise time of the detected pulse,
  TI = the time interval of the detected pulse,
  $\Delta ls$ = the thickness of the substrate, and
  $\Delta lp$ = the projectile base length.

To select the proper point B, the voltage comparator trigger level is set to one half the peak amplitude. As long as the reference and baseline level do not change and the peak amplitude remains constant, a precise measurement can be made. The stability of the voltage comparator reference voltage and the peak amplitude is no problem and will be considered insignificant. However, any baseline modulation has the same effect as changing the trigger level. This effect is shown in the second example of FIG. 6.

Referring now to FIG. 5 and Example #2 of FIG. 6. The 0 volts baseline associated with the detected pulse 90 is shown as being modulated by an extraneous source. The modulation shifts the baseline and the detected pulse 90 in a negative direction, while the trigger level 92 remains the same. Under these conditions the voltage comparator is triggered at a later point in the rise time of the detected pulse signal 90 and at an earlier point during the fall time. This results in a shorter time duration of the time interval pulse 94 and an erroneous velocity measurement. It is also possible under certain circumstances that the baseline modulation will be great enough to shift the time interval pulse so far negative as to prevent the voltage comparator circuit from being triggered entirely.

The use of the differential sensor assembly to effectively suppress any baseline modulation thus greatly improves the system accuracy and reliability. The measurement error (E) of the voltage comparator circuit is reduced by the ratio of the peak amplitude of the pulse to the baseline modulation and can be written as:

$$E = \frac{\pm E \max_c}{\frac{Vp}{\Delta Vb}}$$

where:

$E \max_c$ = the maximum error of the voltage comparator,
$Vp$ = the peak amplitude of the pulse and
$\Delta Vb$ = the amplitude of the baseline modulation.

The use of the differential sensor has been proved in firing tests to reduce the effort of baseline shift by a factor of at least 10. The velocity pulse for these tests are shown in FIGS. 7A and 7B.

Figure 7A:
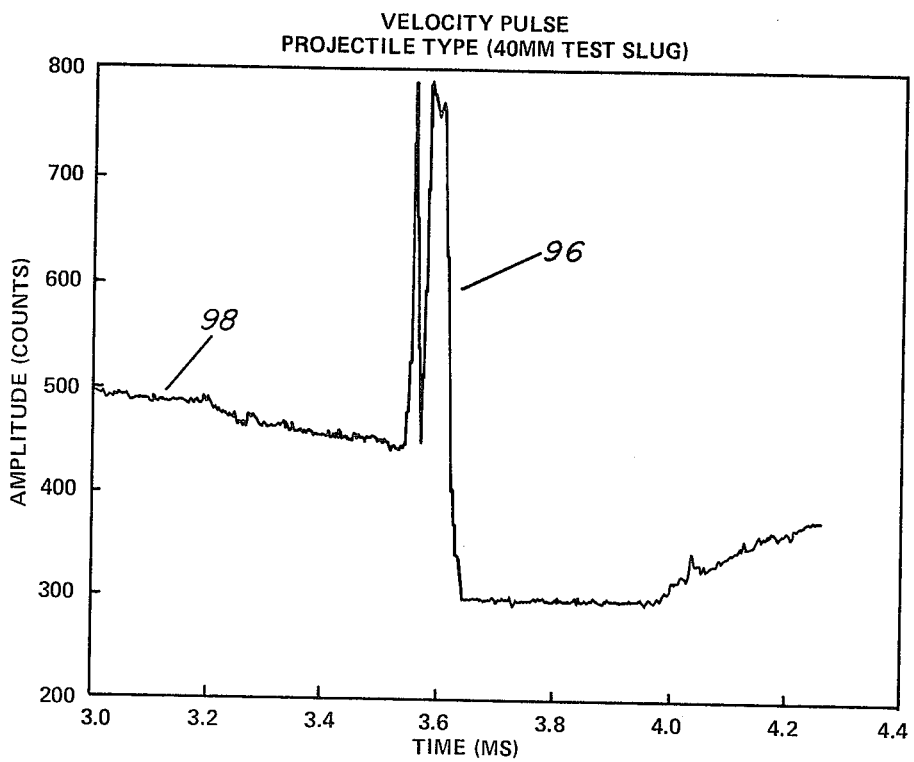
FIG. 7A is a view of the recorded signal output of a prior art electronic velocimeter.
Figure 7B:
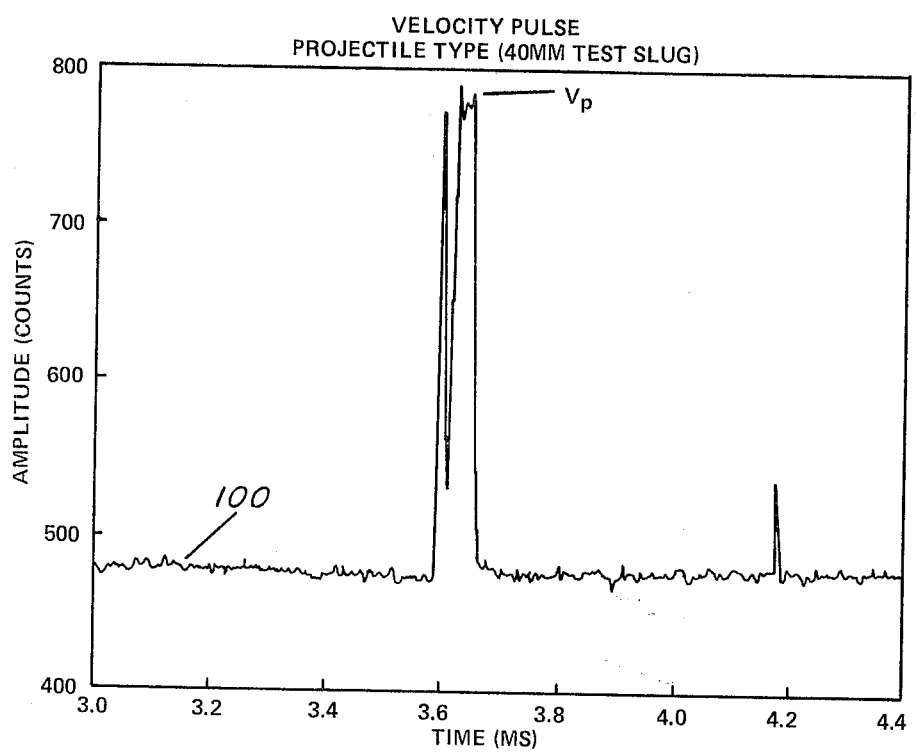
FIG. 7B is a view of the recorded signal output of the present differential sensor electronic velocimeter shown in FIG. 4.

Referring now to FIGS. 7A and 7B, the detected signal 96 in 7A was obtained using the single sensor design disclosed in U.S. Pat. No. 4,228,397. In FIG. 7A there is evidence of extreme baseline modulation 98 before and after the projectile pulse. The velocity calculated for this projectile at muzzle exit was approximately 1370 m/sec. The original sensor was replaced with the present differential sensor and the recorded signal is shown in FIG. 7B. As seen from FIG. 7B the baseline modulation 100 has now been suppressed to the point of being negligible. The same propellant charge was used for both examples and the measured projectile velocity in the second example was calculated to be 1380 m/sec.

An example of the reduction in error can be roughly calculated from the recorded signal. From FIG. 7A the actual projectile signal 96 is 5 volts peak, the baseline modulation prior to projectile exit is approximately 0.7 volts, the projectile length 76.2 mm, substrate thickness 3.17 mm and $E \max_c$ therefore $\pm 4\%$. The measurement error E is:

$$\frac{\pm E \max_c}{\frac{VP}{\Delta Vb}} = \frac{.04}{\frac{5}{.7}} = \pm 0.56\%$$

From the recorded signal obtained from FIG. 7B, using the differential sensor, the baseline modulation 100 is approximately 0.05 volts and the measurement error E is:

$$\frac{\pm E \max_c}{\frac{Vp}{\Delta Vb}} = \frac{.04}{\frac{5}{.05}} = .04\%$$

Thus, the voltage comparator measurement error has been reduced by a factor of appoximately 14 which is now, not a significant part of the overall system error.

While there has been described and illustrated specific embodiments of the invention, it will be obvious that various changes, modifications and additions can be made herein without departing from the field of the invention which should be limited only by the scope of the appended claims.

What is claimed is:

1. A radio frequency coupled differential sensor assembly for improved measurement of projectile velocity at the muzzle end of a gun, which comprises;

clamping means for fixedly holding said sensor assembly to said muzzle end of said gun;

oscillator means for generating a radio frequency signal;

first sensor means electrically coupled to said oscillator means for resonating at approximately the same frequency of said oscillator means, and for generating a modulated signal in response to passage of a projectile therethrough and in response to extraneous sources;

second sensor means operatively disposed in the same plane and coaxial with said first sensor means and electrically coupled to said oscillator means, for resonating at the same frequency of said oscillator, and for generating a modulated signal in response to said extraneous sources but not in response to the passage of said projectile through said first and second sensor means;

shield means fixedly positioned by said clamping means in front of said first and second sensor means for electromagnetically shielding said first and second sensor means and for confining the radiating fields from said first and second sensor means;

seal means operatively disposed intermediate said first and second sensor means for preventing high pressure gases from penetrating between the muzzle end of said gun and first and second sensor means;

first detector means electrically coupled to said first sensor means for generating a detected and filtered signal;

second detector means electrically coupled to said second sensor mean for providing a filtered extraneous signal;

differential amplifier means, having a non-inverting input terminal electrically coupled to the output of said first detector means, and an inverting input terminal electrically coupled to the output of said second detector means, for canceling the components of said detected and filtered signal and said filtered extraneous signal which are equal, and for generating an output pulse of the components of said detected and filtered signal and said filtered extraneous signals which are not common to each other; and amplifier means electrically coupled to the output of said differential amplifier means for generating an output signal proportional to the length of said projectile.

2. A differential sensor assembly as recited in claim 1 wherein said oscillator means includes a Colpitts type oscillator having an output electrically coupled to said first sensor means through a first isolation resistor and another output electrically coupled to said second sensor means through a second isolation resistor.

3. A differential sensor assembly as recited in claim 2 wherein said first sensor means includes a printed metallic circuit coil inner loop member which is electrically insulated from said second sensor means by a substrate open circular insulated area.

4. A differential sensor assembly as recited in claim 2 wherein said second sensor means includes a printed circuit metallic coil outer loop member which is concentrically disposed with respect to said inner loop member and insulated from said inner loop member by said substrate open circular insulated area.

5. A differential sensor assembly as recited in claim 3 wherein said shield means includes a metallic ring disposed on a printed circuit substrate member.

6. A differential sensor assembly as recited in claim 4 wherein said seal means includes an annularly shaped high temperature resistance member operatively disposed intermediate said substsrate of said inner and outer loop members and the front face of said muzzle end of said gun.

* * * * *